April 9, 1935.  L. D. CRANE  1,996,856
VEGETABLE OIL DROPPER
Filed April 6, 1932

INVENTOR
L. D. CRANE

BY (signature)
ATTORNEY

Patented Apr. 9, 1935

1,996,856

UNITED STATES PATENT OFFICE 1,996,856

VEGETABLE OIL DROPPER

Luella D. Crane, Multnomah, Oreg.

Application April 6, 1932, Serial No. 603,667

3 Claims. (Cl. 65—65)

This invention relates generally to the culinary art, and particularly to a vegetable oil dropper.

The main object of this invention is the provision of an exceedingly simple and efficient measuring cup having an attachment which makes it usable as a dropper for vegetable oil.

The second object is to so construct same that it can be manufactured at a very nominal cost and that it will be usable with almost any form of mixing bowl, and also that the user thereof has complete control over the rate of flow of the oil into the ingredients being prepared permitting full use of both hands for the mixing operation.

These, and other objects, will become more apparent from the specification following as illustrated in the accompanying drawing, in which.

Similar numbers of reference refer to similar parts throughout the several views.

Figure 1:
Fig. 1 is a perspective view showing the device in use.
Figure 2:
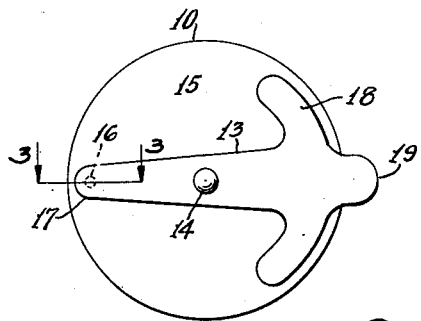
Fig. 2 is a bottom view of the device.
Figure 3:
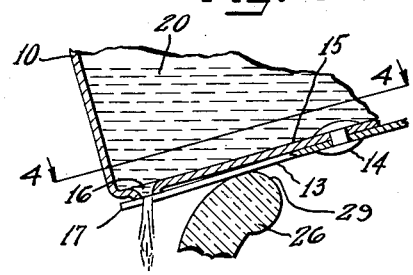
Fig. 3 is a fragmentary vertical section along the line 3—3 in Fig. 2.
Figure 6:
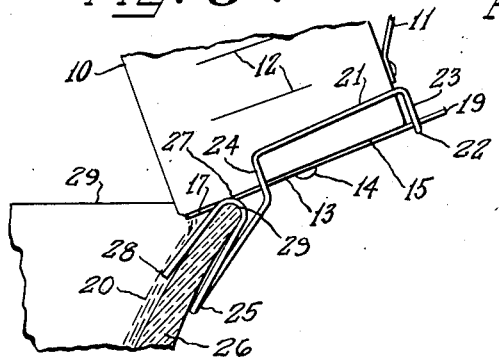
Fig. 6 is a side elevation of the device showing same mounted on a mixing bowl with the bowl broken away in section.
Figure 4:
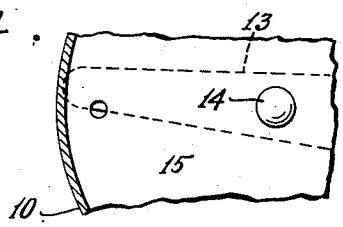
Fig. 4 is a section taken along the line 4—4 in Fig. 3.
Figure 5:
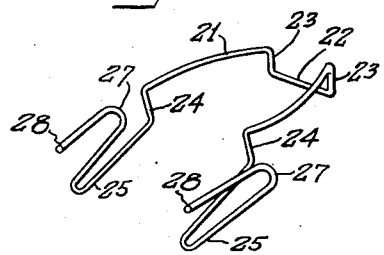
Fig. 5 is a perspective view of the holder.

Referring in detail to the drawing, the device consists primarily of an ordinary form of cylinder measuring cup 10 provided with the usual handle 11 and calibrations 12 for indicating the volume of the contents.

In its preferred form this device consists of a rotatable lever 13, preferably of spring material and mounted on the pivot 14 which, for convenience, is shown in the center of the bottom 15 of the cup 10. The bottom 15 is also provided with an outlet opening 16 which is normally closed by the end 17 of the lever 13. The lever 13 may be provided with the lateral extensions 18 for the purpose of improving the spring action of the lever 13 and also increasing its lateral stability. A handle 19 projects from the lever 13 beyond the circumference of the cup 10. Obviously, a movement of the handle 19 causes the lever 13 to rotate on its pivot 14 and will control the flow of oil 20 through the opening 16.

While any convenient form of support may be employed there is provided a bent wire holder 21 which engages the sides of the cup 10 a short distance above the bottom 15, which distance is determined by a horizontal back portion 22 at each end of which is an upright stop 23 which merges into the curved side portions of the holder 21. The intermediate portions 24 extend downwardly from the curved portions of the holder 21 approximately the same distance as do the stops 23 and then form a double reverse bend, the first portion 25 of which is well down the outside of the bowl 26, while the second bend 27 is on the upper edge of the bowl 26, and the extreme tips 28 extend downwardly on the inside of the bowl 26 a short distance from its upper edge 29.

The wire holder thus described is made of one piece and, as can be seen, will fit a wide range of bowl curvatures, slopes and thicknesses, leaving always a pocket into which may be inserted the cup 10 which is prevented from dropping through the pocket by the handle 19 which rests on the top side of the portion 22.

In practice the user places the cup 10 on a level surface for the purpose of accurately measuring the quantity of oil to be used in a given recipe. The handle 19 is, of course, turned to a closed position. When the ingredients are ready for the addition of the oil the holder 21 is put in place on the mixing bowl, the cup 10 is set in position and the handle 19 moved to a point which will permit the oil to flow into the bowl at the desired rate, which may be modified from time to time as desired or cut off altogether if necessary. While the oil is flowing into the bowl 26, the operator has both hands free to use for stirring purposes, the advantage of which will be appreciated by anyone who has attempted to add oil to any mixture in which the oil and the mixture should unite as rapidly as the oil is added. It is the common practice for one person to do the mixing while another pours the oil, although this is not entirely satisfactory in view of the difficulty of pouring the oil at a uniformly low rate.

Figure 7:
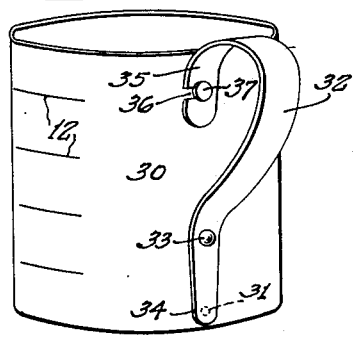
Fig. 7 is a perspective view showing a modified form of the device.

In the form shown in Fig. 7 the cup 30 is identical with the cup 10, except for the fact that the outlet opening 31 is in the side and the handle 32 is pivoted on the rivet 33 having its lower end 34 serving as a closure for the outlet 31, while its bent upper end 35 is provided with a slot 36 which engages the shouldered rivet 37. Obviously, a change of position of the handle 32 will change the flow of oil through the opening 31.

Attention is called to my United States Patent Number 1,824,394, over which this device is an improvement, inasmuch as it is much easier to manufacture, provides better control for the rate of flow and makes it possible to use the device as an ordinary measuring cup.

I claim:

1. A vegetable oil dropper having in combination a measuring cup having an outlet opening near the edge of the bottom thereof, a rotatable closure for said opening, means for pivotally mounting said closure on the under side of the bottom of said cup, handle means for operating said closure, and a holder for said dropper consisting of a wire frame forming a pocket including clips for engaging the sides of a mixing bowl in which pocket said cup may be held above the mixing bowl with the cup floor inclining from the horizontal position and with the outlet opening of said cup lowermost.

2. A vegetable oil dropper having in combination a measuring cup provided with an opening in the bottom thereof near its outer edge, a flat spring lever pivotally mounted against the under side of the cup bottom one end of which forms a closure for said opening and the other end of which constitutes a handle and projects outwardly beyond the circumference of said cup, a holder for said cup consisting of a wire frame bent to form a pocket therefor and having clip means to clamp over the edge of a mixing bowl with its bottom inclining inwardly toward its outlet, and stop means on said holder on each side of said handle.

3. A vegetable oil dropper consisting of a cup having an outlet opening at one side of its bottom and having a flat spring lever pivotally mounted against the bottom of said cup at the center thereof, one end of said lever forming a closure for said opening against which it is held by the inherent spring action of said lever, and the other end forming a handle by means of which said lever may be operated, said lever being frictionally held in any desired position.

LUELLA D. CRANE.